(12) United States Patent
Englander

(10) Patent No.: US 7,771,060 B2
(45) Date of Patent: Aug. 10, 2010

(54) ANTI-GLARE VEHICULAR MIRROR

(75) Inventor: Benjamin Englander, Jamaica, NY (US)

(73) Assignee: Rosco, Inc., Jamaica, NY (US)

( * ) Notice: Subject to any disclaimer, the term of this patent is extended or adjusted under 35 U.S.C. 154(b) by 0 days.

(21) Appl. No.: 09/757,130

(22) Filed: Jan. 9, 2001

(65) Prior Publication Data

US 2002/0089753 A1   Jul. 11, 2002

(51) Int. Cl.
*G02B 17/00* (2006.01)
*G02B 27/00* (2006.01)

(52) U.S. Cl. .................. 359/603; 359/601; 359/608; 359/838

(58) Field of Classification Search ......... 359/601–615, 359/828–869, 884, 883; 248/475.4
See application file for complete search history.

(56) References Cited

U.S. PATENT DOCUMENTS

| | | | | |
|---|---|---|---|---|
| 1,768,354 A | * | 6/1930 | Falge | 359/608 |
| 1,811,823 A | * | 6/1931 | Horton | 359/603 |
| 1,910,503 A | * | 5/1933 | Schollmeyer | 359/608 |
| 2,711,560 A | * | 6/1955 | Beckham | 359/601 |
| 3,199,114 A | * | 8/1965 | Malifaud | 351/45 |
| 4,436,372 A | * | 3/1984 | Schmidt et al. | 359/868 |
| 4,822,157 A | * | 4/1989 | Stout | 359/868 |
| 4,938,578 A | * | 7/1990 | Schmidt et al. | 359/868 |
| 5,589,984 A | | 12/1996 | Schmidt et al. | 359/603 |
| 6,293,679 B1 | * | 9/2001 | Schmidt et al. | 359/603 |
| 6,572,233 B1 | | 6/2003 | Northman et al. | 359/839 |
| 2007/0030582 A1 | * | 2/2007 | Schmidt | 359/868 |

FOREIGN PATENT DOCUMENTS

JP    62-192720    * 8/1987

* cited by examiner

*Primary Examiner*—Thong Nguyen
(74) *Attorney, Agent, or Firm*—Wilmer Cutler Pickering Hale and Dorr LLP

(57) ABSTRACT

A mirror element for a school bus is mounted to the front to provide wide angle viewing of the ground in front of and to the side of the bus. An upper portion of the mirror element which is generally dome shaped is treated to reduce glare.

13 Claims, 2 Drawing Sheets

ANTI-GLARE VEHICULAR MIRROR

BACKGROUND OF THE INVENTION

The present invention relates to mirrors for school buses, trucks, vans or any vehicle and, in particular, mirrors for school buses which are mounted on the front of the buses and which are glare resistant while still providing large fields of view.

For decades, it has been known to fit school buses with mirrors mounted on the front fenders which provide very wide angle fields of view, enabling the bus drivers to carefully monitor the bus along the front and sides thereof. Providing such mirrors is necessary as a matter of the safety of our children.

Typically, such mirrors are spherical or nearly spherical in shape. Many are dome shaped, to achieve the wide field of view.

These mirrors are very well known in the art, as exemplified by the 1933 U.S. Pat. No. 1,905,623 to Deitz. Similar mirrors are also disclosed in U.S. Pat. Nos. 4,436,372; 4,512,634; 5,005,963; 4,500,063; 4,938,578 and many other similar patents. The contents of the aforesaid patents are incorporated by reference herein.

While the mirrors of the prior art achieve their intended objectives of providing wide fields of view both in the horizontal and vertical (azimuth) directions, there are certain drawbacks to their use. Specifically, the inventor herein has determined that the provision of wide fields of view along the azimuth direction sometimes adversely affects the optimization of the operability of the mirror system.

Other prior art, dealing with the subject matter of vehicular mirrors and the subject of undesired light reflection, includes U.S. Pat. Nos. 1,311,253, 1,811,823; 2,514,989; 2,881,655; 3,764,201; 4,822,157; 5,589,984, as well as WO 8503136 dated July 1985 and German Patent 2148022 dated March 1973. The contents of the foregoing U.S. patents are incorporated by reference herein.

SUMMARY OF THE INVENTION

In accordance with the present invention, a portion of the mirror's surface is treated to reduce or eliminate glare. Specifically, in accordance with the present invention, the mirror's surface is notionally divided along the azimuth vertical direction into several zones. To obtain the maximal glare reduction, the top one half portion of the mirror is treated for reducing glare. Preferably, however, only the top one-third portion is so treated, in order to minimize the surface area which shows a darker or duller image due to the anti-glare treatment. Thus, an image is still visible although in a darker which reduces possibly disturbing or confusing glare.

The methods of fabricating and/or treating mirror surfaces to reduce glare are well known in the art. For example, there are non-glare coatings that can be applied to the mirror surface. Another approach is to adhere a cellophane based thin membrane shield or cover over a portion of the mirror surface. Still another approach involves a chroming process to reduce glare. That is, a chrome plating is applied on the front surface of the mirror glass.

Other features and advantages of the present invention will become apparent from the following description of the invention which refers to the accompanying drawings.

DETAILED DESCRIPTION OF EMBODIMENTS OF THE INVENTION

Figure 1:
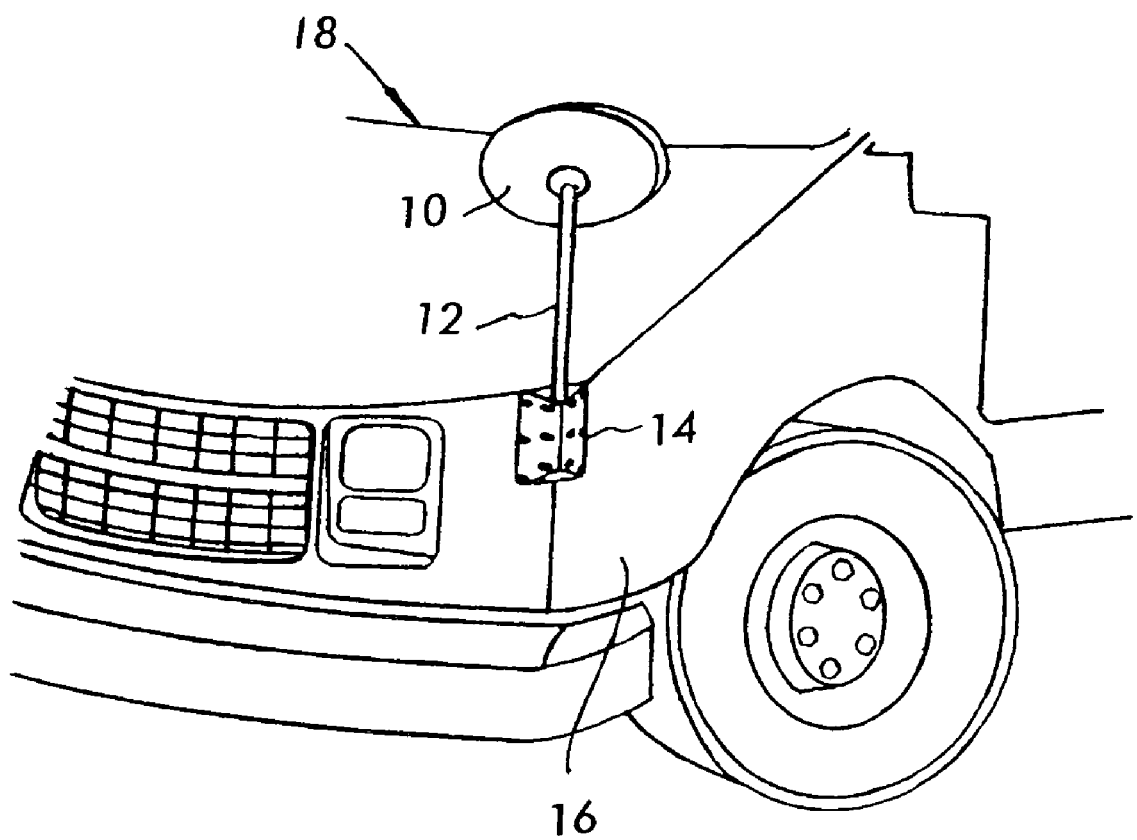
FIG. 1 is a perspective of a typical prior art wide angle spherical mirror attached to a school bus.
Figure 2A:
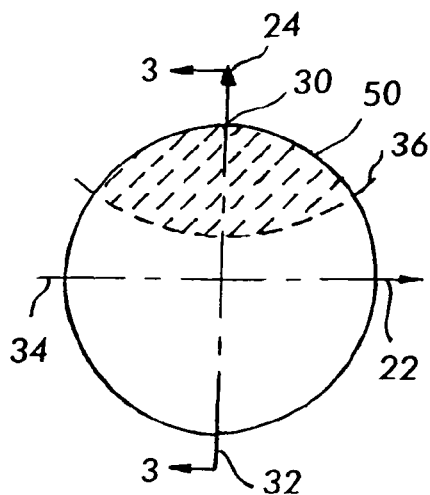
FIGS. 2A, 2B and 2C show front views of several spherical mirrors for school buses which have been treated to reduce glare.
Figure 2B:
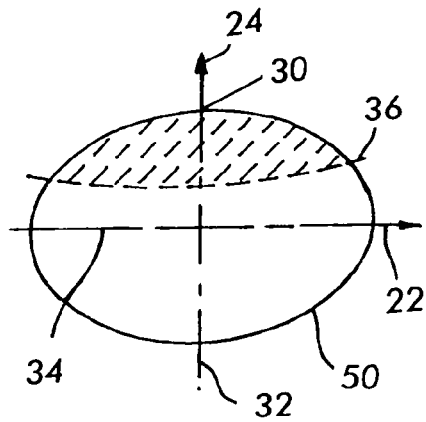
Figure 2C:
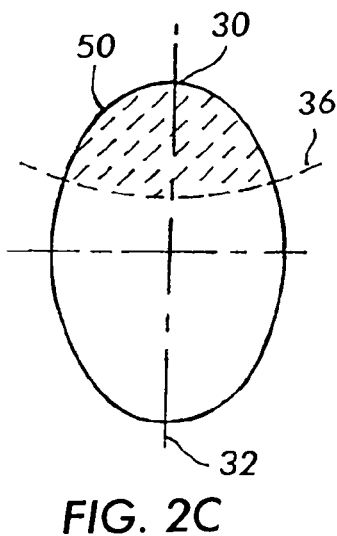

With reference to FIG. 1, a mirror element 10 is affixed to a mirror pole 12 which is in turn received in a mirror mount 14 by which the mirror 10 is thus secured to the front fender 16 of a school bus 18. The mirror element 10 is generally dome shaped (FIG. 3), but can have a variety of peripheral edge shapes, for example, circular as shown in FIG. 2A, horizontally oval as shown in FIG. 2B or vertically oval as shown in FIG. 2C. The depth of the dome relative to the base 20 (FIG. 3) of the mirror 10 can be selected to choose different angles of view, as is well known. Also, as is known in the art, the mirror element 10 can have one field of view in the horizontal direction (denoted by the arrows 22 in FIGS. 2A and 2B) and a different angle of view in the vertical direction as denoted by the arrows 24. The angle of view magnitude is determined by the radius of curvature of the mirror surface in the horizontal and vertical directions.

Figure 3:
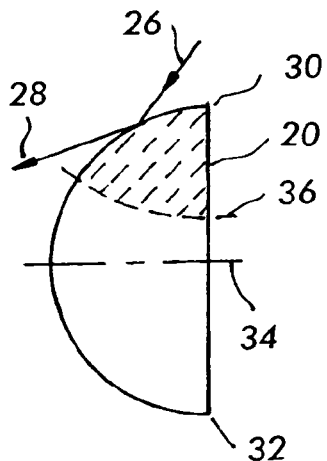
FIG. 3 is a cross-section along the line 3-3 in FIG. 2A.

An occasional problem which has affected spherical mirrors of the type indicated is the possibility of reflection of the sun rays from the upper half of the mirror element as indicated by the arrows 26 and 28 in FIG. 3 when the mirror is not optimally mounted.

In accordance with the present invention, one can view the mirror element of FIGS. 2A, 2B and 2C as having a surface which extends vertically from a highest point at position 30 to a lowest point at position 32. The sun rays reflection problem is solved by treating a portion, specifically the upper portion of the mirror surface with an anti-glare material, in any of the manners well known in the art, as set forth in the summary of the invention section of the present description.

With reference to FIG. 2A, in the broadest application of the present invention, the treated surface encompasses that portion of the mirror element surface 10 which begins at the uppermost position 30 and continues to about halfway down the vertical direction, to the line which is identified by reference numeral 34. In a mirror element fabricated so that the upper one half portion of the dome surface is treated for glare, the image in that portion will be darkened because of the glare treatment. It is important not to increase the portion treated with anti-glare material beyond the bottom one half portion because the glare treatment reduces the sharpness of the image and it is important that the lower half mirror which points to the front of the bus where very young, short children may be standing is not affected.

Preferably, however, it is sufficient for reduction of the glare problem if only the top one third of the mirror surface is treated with the anti-glare material. In this preferred embodiment, only the surface above the curved line identified by reference number 36 (in FIG. 2A) is covered with the anti-glare material. Note that the line 36 is curved relative to the straight surface bisecting line 22. In some embodiments, the portion treated to reduce glare encompasses less than one-third of the mirror surface.

Figure 4:
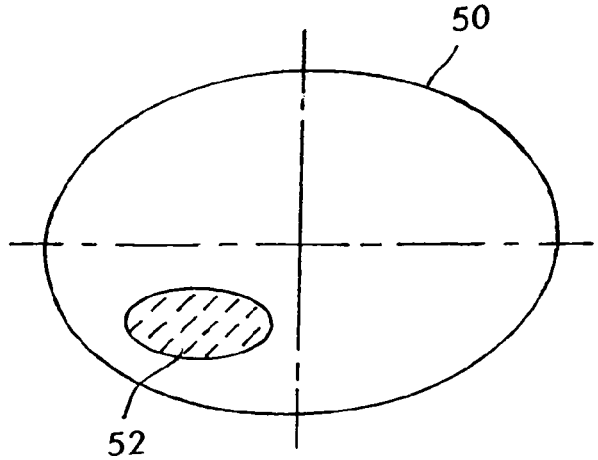
FIG. 4 shows a further placement of anti-glare treated areas on a oval shaped surface of a convex mirror.

In the foregoing description, the surface of the reflecting mirror, which has been treated for reducing glare, always had a portion which bordered the peripheral circumscribing edge of the reflecting surface. The peripheral edge is the circumferential edge 50 of the reflecting surface. However, turning to FIG. 4, the invention also encompasses applying onto the surface of the reflecting mirror an island of anti-glare coating selected specifically to deal with any location on the mirror surface from which the undesired reflection may emanate. This area is shown in FIG. 4, as area 52, but that area can be in any of the other quadrants or may be larger than as shown or may straddle several quadrants. The consideration is always to ensure that the area or island that has been treated with anti glare material, is located away from the peripheral edge 50 of the reflective surface. There is a logical reason to proceed with the approach of FIG. 4. That is because the image is rather smaller near the mirror edges, and one would not want to miss the image of a child reflected near the circumferential edge 50 of the mirror surface due to dulling of the image. Also, it is perceived that one would typically not encounter undesired reflection near the edges.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cross-view, school bus mirror assembly, comprising:
   a mirror element having a contoured outer surface, said mirror surface shaped to provide a wide angle field of view of a predetermined scene, which said view extends both in a horizontal direction and in a vertical direction along a front and at least one side of a school bus, said scene including images of both said front and said at least one side of said school bus;
   a mirror pole;
   the mirror element being affixed to the mirror pole and the contoured outer surface of the mirror element being used to provide the wide angle field of view of said predetermined scene to a driver of said school bus, while said driver drives said school bus;
   a mirror mount for connecting the mirror pole to a front fender of said school bus; and
   the contoured outer surface of the mirror element being a convex, generally dome shaped and contiguous mirror surface surrounded by a peripheral edge, the outer mirror surface proceeding in said vertical direction from an uppermost position to a lowermost vertical position and facing toward the driver of said school bus to which the mirror element is mounted, a portion of the outer surface, which comprises less than one-half of the surface taken in the vertical direction, beginning from the uppermost position on the contoured mirror surface and ending above a straight notional line which bisects the mirror surface in the horizontal direction, being treated with and comprising an antiglare material which reduces glare, including from sun rays, without rendering the treated surface opaque as to be non-reflective, the outer surface of the mirror element thereby comprising the treated surface and a non-treated surface, whereby the mirror surface enables the driver to simultaneously observe a first part of the scene at the treated surface and a second part of the scene at the non-treated surface.

2. The mirror of claim 1, wherein the portion treated to reduce glare encompasses less than one-third of said surface.

3. The mirror of claim 1, in which the portion treated to reduce glare is formed with a chroming process.

4. The mirror of claim 1, wherein the convex generally dome shaped mirror surface is oval shaped.

5. The mirror of claim 4, in which the oval shape surface has associated therewith a minor axis and a major axis and the portion treated to reduce glare is located in an upper portion of the mirror surface relative to the major axis of the mirror.

6. The mirror of claim 1, in which the portion treated to reduce glare is located on one side relative to a minor axis of the mirror surface.

7. A school bus in combination with a mirror assembly, comprising in combination:
   a school bus;
   a mirror element having a contoured outer surface, said mirror surface utilized to provide a wide angle field of view of a predetermined scene, which extends both in a horizontal direction and in a vertical direction along a front and at least one side of said school bus, said scene including images of both said front and said at least one side of said school bus;
   a mirror pole;
   the mirror element being affixed to the mirror pole and the contoured outer surface of the mirror element being used to provide the wide angle field of view of said predetermined scene to a driver of said school bus, while said driver drives said school bus;
   a mirror mount for connecting the mirror pole to a front fender of said school bus; and
   the contoured outer surface of the mirror element being a convex, generally dome shaped and contiguous mirror surface surrounded by a peripheral edge, the outer mirror surface proceeding in said vertical direction from an uppermost position to a lowermost vertical position and facing toward the driver of said school bus to which the mirror element is mounted, a portion of the outer surface, which comprises less than one-half of the surface taken in the vertical direction, beginning from the uppermost position on the contoured mirror surface and ending above a straight notional line which bisects the mirror surface in the horizontal direction, being treated with an antiglare material to reduce glare, including from sun rays, without rendering the treated surface opaque as to be non-reflective, the outer surface of the mirror element thereby comprising the treated surface and a non-treated surface, whereby the mirror surface enables the driver to simultaneously observe a first part of the scene at the treated surface and a second part of the scene at the non-treated surface.

8. A cross-view, school bus or vehicle mirror assembly, comprising:
   a mirror pole;
   a mirror mount for connecting said mirror pole to a front fender of a school bus or vehicle;
   a mirror element affixed to said mirror pole and having a contoured outer mirror surface comprising a convex, generally dome shaped mirror surface having a peripheral edge and having an upper area capable of reflecting images located above a bottom half portion of the mirror element, and the contoured outer mirror surface facing toward the school bus or vehicle to which the mirror element is mounted, and the contoured outer mirror surface of the mirror element facing toward a driver of the school bus or vehicle; and
   an antiglare material treated on the upper area of the dome shaped mirror surface above a bottom half of said contoured outer mirror surface of said mirror element to reduce glare from sun rays emanating at least from a direction in front of the driver from the front or sides of the school bus or vehicle with respect to a first image portion located above the bottom half portion of the mirror element while darkening the first image portion reflected thereby, and
   wherein the bottom half portion of the mirror element is free of antiglare material that reflects a second image portion without darkening the second image portion.

9. The mirror assembly of claim 8, wherein the upper area above the bottom half of said contoured outer mirror surface on which the antiglare material is disposed and treated comprises less than one-third of said contoured outer mirror surface.

10. The mirror assembly of claim 8, wherein the antiglare material is disposed and treated on the upper area with a chroming process.

11. The mirror assembly of claim 8, wherein the mirror surface is oval shaped.

12. The mirror assembly of claim 11, wherein the oval shaped mirror surface has associated therewith a minor axis and a major axis, and wherein the upper area on which the antiglare material is disposed and treated is located in an upper portion of the mirror surface relative to the major axis of the mirror surface.

13. A cross-view, school bus or vehicle mirror assembly, comprising:

a mirror pole;

a mirror mount for connecting said mirror pole to a front fender of a school bus or vehicle;

a mirror element affixed to said mirror pole and having a contoured outer mirror surface comprising a convex, generally dome shaped mirror surface having a peripheral edge and having an upper area capable of reflecting images located above the bottom half portion of the mirror element, and the contoured outer mirror surface facing toward the school bus or vehicle to which the mirror element is mounted, and the contoured outer mirror surface of the mirror element facing toward a driver of the school bus or vehicle; and an antiglare material treated on the upper area of the dome shaped mirror surface above a bottom half of said contoured outer mirror surface of said mirror element to reduce glare from sun rays emanating at least from a direction in front of the driver from the front or sides of the school bus or vehicle, and wherein the bottom half portion of the mirror element is free of antiglare material.

* * * * *